US008482889B2

(12) United States Patent
Huang et al.

(10) Patent No.: US 8,482,889 B2
(45) Date of Patent: Jul. 9, 2013

(54) BAND-PASS STRUCTURE ELECTROSTATIC DISCHARGE PROTECTION CIRCUIT

(75) Inventors: Bo-Jr Huang, Taipei (TW); Huei Wang, Taipei (TW)

(73) Assignee: National Taiwan University, Taipei (TW)

( * ) Notice: Subject to any disclaimer, the term of this patent is extended or adjusted under 35 U.S.C. 154(b) by 419 days.

(21) Appl. No.: 12/795,429

(22) Filed: Jun. 7, 2010

(65) Prior Publication Data
US 2011/0181990 A1 Jul. 28, 2011

(30) Foreign Application Priority Data
Jan. 27, 2010 (TW) .............................. 99102242 A

(51) Int. Cl.
*H02H 9/00* (2006.01)
*H02H 3/22* (2006.01)

(52) U.S. Cl.
USPC .......................................... 361/56; 361/111

(58) Field of Classification Search
USPC ................................................... 361/56, 111
See application file for complete search history.

(56) References Cited

U.S. PATENT DOCUMENTS

| | | | |
|---|---|---|---|
| 6,693,780 B2 * | 2/2004 | Spehar et al. ................... | 361/56 |
| 6,801,416 B2 | 10/2004 | Hatzilambrou et al. | |
| 6,885,534 B2 | 4/2005 | Ker et al. | |
| 6,894,567 B2 | 5/2005 | Vickram et al. | |
| 7,009,826 B2 | 3/2006 | Ker et al. | |
| 7,023,678 B2 | 4/2006 | Ker et al. | |
| 7,280,332 B2 * | 10/2007 | Ma et al. ....................... | 361/91.1 |
| 7,391,596 B2 | 6/2008 | Khorram | |
| 7,649,722 B2 * | 1/2010 | Thijs et al. ....................... | 361/56 |
| 7,880,195 B2 * | 2/2011 | Ker et al. ....................... | 257/173 |
| 2007/0296055 A1 * | 12/2007 | Yen et al. ....................... | 257/531 |

OTHER PUBLICATIONS

Ming-Dou Ker,Design on ESD Protection Scheme for IC With Power-Down-Mode Operation, IEEE Journal of Solid-State Circuits, vol. 39, No. 8, Aug. 2004, pp. 1378-1382.
Ming-Dou Ker, Design on Power-Rail ESD Clamp Circuit for 3.3-V I/O Interface by Using Only 1-V/2.5-V Low-Voltage Devices in a 130-nm CMOS Process, IEEE Tranactionson Circuits and Systems—1:Regular Papers, vol. 53, No. 10, Oct. 2006, pp. 2187-2193.
Sherif Galal, Broadband ESD Protection Circuits in CMOS Technology, IEEE Journal of Solid-State Circuits, vol. 38, No. 12, Dec. 2003, pp. 2334-2340.
MIng-Dou Ker, Decreasing-Size Distributed ESD Protection Scehme for Broad-Band RF Circuits, IEEE Tranasctions on Microwave Theory and Techniques, vol. 53, No. 2, Feb. 2005, pp. 582-589.

\* cited by examiner

*Primary Examiner* — Rexford Barnie
*Assistant Examiner* — Christopher Clark
(74) *Attorney, Agent, or Firm* — Muncy, Geissler, Olds & Lowe, PLLC

(57) ABSTRACT

The present invention relates to an electrostatic discharge (ESD) protection circuit, and more particularly to a band-pass structure electrostatic discharge protection circuit. An ESD protection circuit is disposed at the input of a radio frequency (RF) core circuit. The ESD protection circuit comprises a plurality of diodes and inductors constructing a plurality of discharging paths, wherein the diodes and inductors forms a band-pass filter structure. Such that, the RF core circuit with the ESD protection circuit of the present invention feature much higher ESD robustness and better RF performance than the conventional design.

11 Claims, 10 Drawing Sheets

BAND-PASS STRUCTURE ELECTROSTATIC DISCHARGE PROTECTION CIRCUIT

FIELD OF THE INVENTION

The present invention relates to an electrostatic discharge (ESD) protection circuit, and more particularly to a band-pass structure electrostatic discharge protection circuit.

BACKGROUND OF THE INVENTION

Nowadays, the wireless communication industry plays a much important role in the economic advancement. A variety of Radio Frequency (RF) circuit designs and researches are provided for improving the efficiency or performance of the RF devices.

With respect to the radio frequency transceiver circuit or sub-circuit, such as a low noise amplifier or a power amplifier, the input/output (I/O) pad is exposed directly to the environment through an antenna or other I/O element. Thus, it is possible for the RF transceiver circuit or sub-circuit to be damaged by the electrostatic discharge (ESD) that occurs in the environment because of the weather or other artificial interference.

A traditional ESD protection circuit is shown in FIG. 1. The ESD protection circuit 16 is attached to the I/O pad 14 of the RF circuit 12. The ESD protection circuit 16 comprises a diode 161 connected between the I/O pad 14 and the power source VC, and a diode 163 connected between the I/O pad 14 and the ground. Wherein the diode 161 is used as a positive ESD path, and the diode 163 is used as a negative ESD path.

When a positive ESD occurs at the I/O pad 14, the diode 161 will be under forward-biased condition, and the ESD current will be conducted to the power source VC through the positive ESD path. When a negative ESD occurs at the I/O pad 14, the diode 163 will be under forward-biased condition, and the ESD current will be conducted to the ground through the negative ESD path.

For an ESD protection circuit, the more ESD paths are comprised, the less discharging time is needed, and the more robust the ESD protection circuit is. On the other hand, if there are more diodes used as ESD paths in the ESD protection circuit, the larger the parasitic capacitance is, and the performance of the RF circuit will be degraded much seriously.

Referring to FIG. 2, there is shown a schematic diagram of another conventional ESD protection circuit. The ESD protection circuit 20 is attached to the I/O pad 203 of the RF circuit 201. The ESD protection circuit 20 comprises a plurality pairs of diodes 221, 223, 241, 243, 261, 263, 281, and 283. Each pair of diodes is connected between the power source 205 and the ground 207 in series. The I/O pad 203 and said diodes are connected with transmission lines 251, 253, 255, and 257. Wherein said plurality of diodes are used as positive ESD paths and negative ESD paths for providing high ESD robustness.

The equivalent circuit of the ESD protection circuit 20 is shown in FIG. 3. Wherein each diode acts as an equivalent capacitor, such as 321, 323, 341, 343, 361, 363, 381, and 383, at the operation frequency of the RF circuit 201. Each transmission line acts as an equivalent inductor, such as 351, 353, 355, and 357, at the operation frequency of the RF circuit 201.

Assume that the equivalent capacitance of each diode is $C_{ESD}$, the equivalent inductance of each transmission line is $L_{line}$, and the equivalent capacitance of each transmission line is $C_{line}$, than the characteristic impedance $Z_o$ of the ESD protection circuit is $\sqrt{(L_{line}/(C_{line}+2C_{ESD}))}$.

In general, the chip size of an RF amplifier is 1.5 mm×1 mm. If the characteristic impedance of the ESD protection circuit 20 fits in with the characteristic impedance of the RF amplifier, i.e. 50 ohm, the length of transmission line in the ESD protection circuit 20 should be 1 mm. This means that an extra chip size area is needed for the ESD protection circuit 20.

SUMMARY OF THE INVENTION

It is an objective of the present invention to provide an electrostatic discharge (ESD) protection circuit, and more particularly to a band-pass structure electrostatic discharge protection circuit.

It is another objective of the present invention to provide a band-pass structure ESD protection circuit comprising a plurality of diodes and two inductors, wherein the plurality of diodes construct a plurality of positive ESD paths and a plurality of negative ESD paths. The diodes and inductors are configured to form a band-pass filter for improving the ESD robustness of the RF core circuit.

It is another objective of the present invention to provide a band-pass structure ESD protection circuit ensuring the RF core circuit high performance under high ESD stress.

It is another objective of the present invention to provide a band-pass structure ESD protection circuit using spiral inductors for reducing chip area and improving the ESD robustness of the RF core circuit.

It is another objective of the present invention to provide a band-pass structure ESD protection circuit for applications in gallium arsenic (GaAs) based process.

It is another objective of the present invention to provide a band-pass structure ESD protection circuit for intergraded with an RF core circuit in a chip.

It is another objective of the present invention to provide a band-pass structure ESD protection circuit that abides high voltage ESD stress more than 19.8 kV in human body model (HBM).

It is another objective of the present invention to provide a band-pass structure ESD protection circuit that abides high voltage ESD stress more than 7 kV in machine model (MM).

It is another objective of the present invention to provide a band-pass structure ESD protection circuit for integrated with an RF core circuit, such as an RF transceiver, a low noise amplifier, a power amplifier or a mixer.

The present invention provides a band-pass structure ESD protection circuit which is connected between an external pad and an input/output (I/O) port of a radio frequency (RF) core circuit, comprising: a first diode and a second diode, wherein the first diode is connected between a power source and the external pad, the second diode is connected between the external pad and the ground, and the first diode and the second diode are connected in series; a third diode and a fourth diode, wherein the third diode is connected between the power source and the I/O port, the fourth diode is connected between the I/O port and the ground, and the third diode and the fourth diode are connected in series; a fifth diode and a sixth diode connected between the external pad and the I/O port reversely in parallel; a first inductor connected between the external pad and the ground; and a second inductor connected between the I/O port and the ground.

The present invention further provides a band-pass structure ESD protection circuit which is connected between an external pad and an I/O port of an RF core circuit, comprising: a plurality of first diodes and second diodes, wherein each pair of first diode and second diode is connected between a power source and the ground in series; at least one pair of third diode and fourth diode, wherein each pair of third diode and fourth diode is connected between adjacent pairs of first diodes and second diodes reversely in parallel; a first inductor connected between the external pad and the ground; and a second inductor connected between the I/O port and the ground.

DETAILED DESCRIPTION OF DISCLOSED EMBODIMENTS

Figure 4:
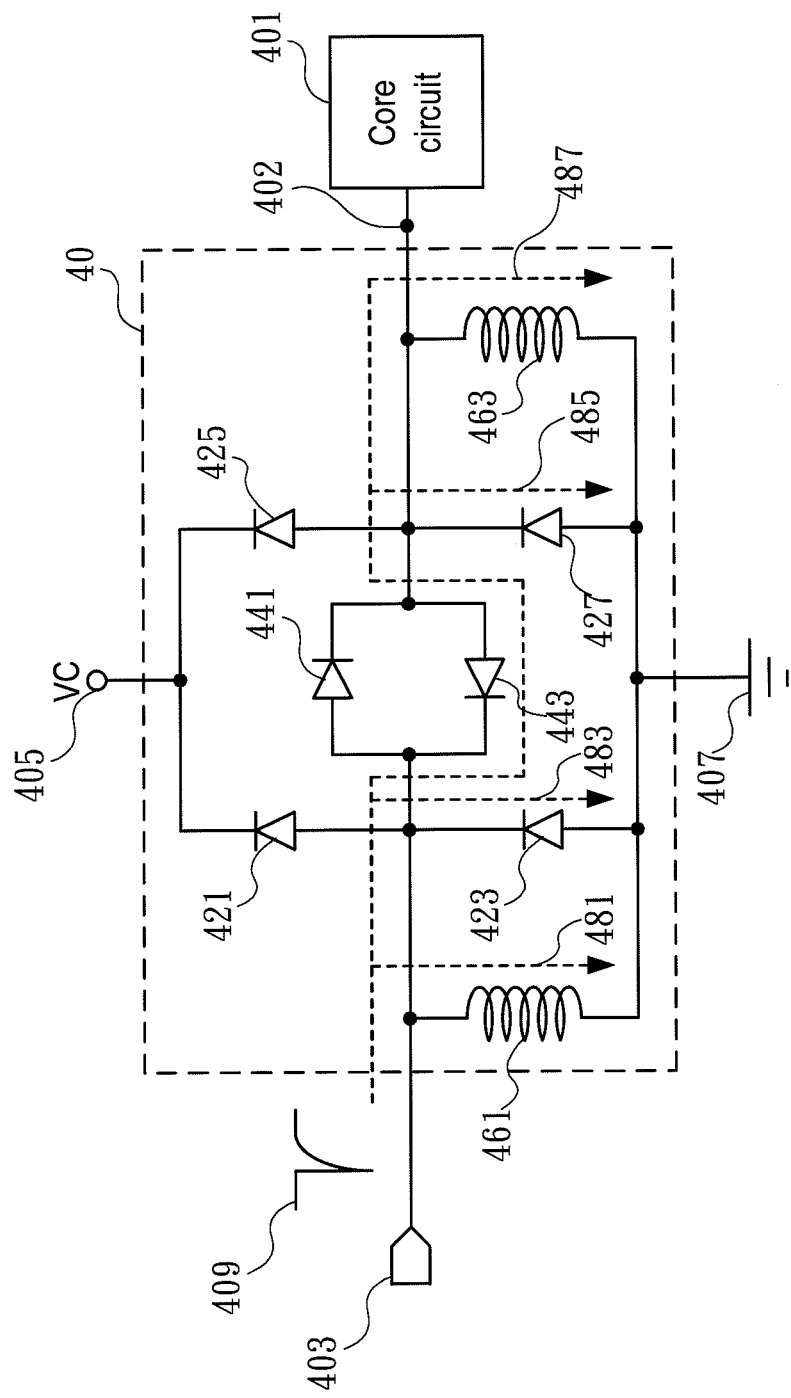
FIG. 4 is a schematic diagram of an ESD protection circuit in accordance with one embodiment of the present invention.

Referring to FIG. 4, there is shown a schematic diagram of an ESD protection circuit in accordance with one embodiment of the present invention. The band-pass structure ESD protection circuit 40 comprises a first diode 421, a second diode 423, a third diode 425, a fourth diode 427, a fifth diode 441, a sixth diode 443, a first inductor 461, and a second inductor 463.

The first diode 421 is connected between a power source 405 and an external pad 403, the second diode 423 is connected between the external pad 403 and the ground 407. The third diode 425 is connected between the power source 405 and the I/O port 402 of the RF core circuit 401, the fourth diode 427 is connected between the I/O port 402 and the ground 407. The first diode 421 and the second diode 423 are connected in series. The third diode 425 and the fourth diode 427 are connected in series.

The fifth diode 441 and the sixth diode 443 are connected between the external pad 403 and the I/O port 402 reversely in parallel. The first inductor 461 is connected between the external pad 403 and the ground 407. The second inductor 463 is connected between the I/O port 402 and the ground 407.

In the present invention, when a negative ESD 409 occurs at the external pad 403, the second diode 423, the sixth diode 443, and the fourth diode 427 will be under forward-biased condition, and most of the ESD current will be conducted to the ground 407 through the ESD paths 483 and 485. The rest of the ESD current will be conducted to the ground 407 through the ESD paths 481 and 487 formed by the inductors.

Figure 5:
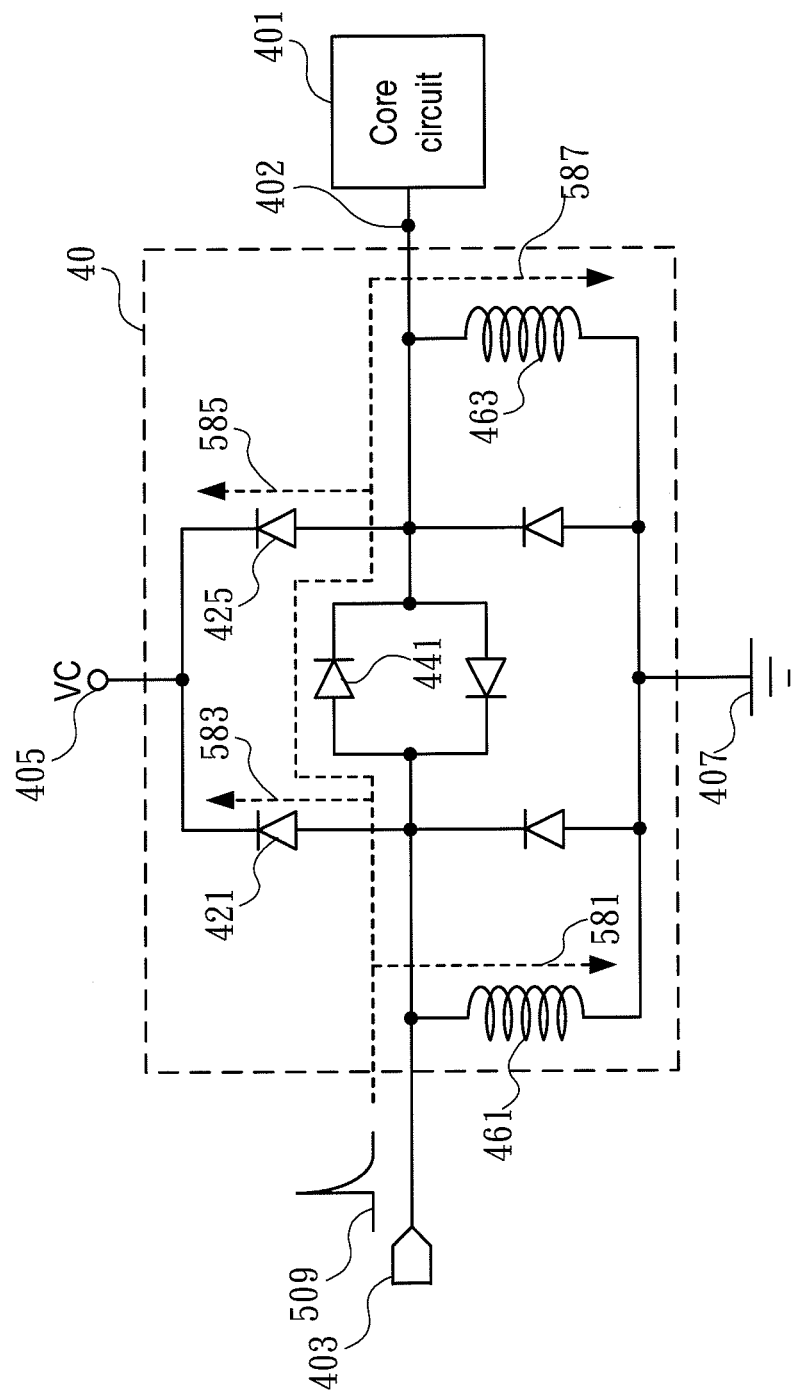
FIG. 5 is a schematic diagram of positive ESD paths in accordance with the embodiment shown in FIG. 4.

Referring to FIG. 5, there is shown a schematic diagram of positive ESD paths in accordance with the embodiment shown in FIG. 4. When a positive ESD 509 occurs at the external pad 403, the first diode 421, the fifth diode 441, and the third diode 425 will be under forward-biased condition, and most of the ESD current will be conducted to the power source 405 through the ESD paths 583 and 585. The rest of the ESD current will be conducted to the ground 407 through the ESD paths 581 and 587.

Figure 6:
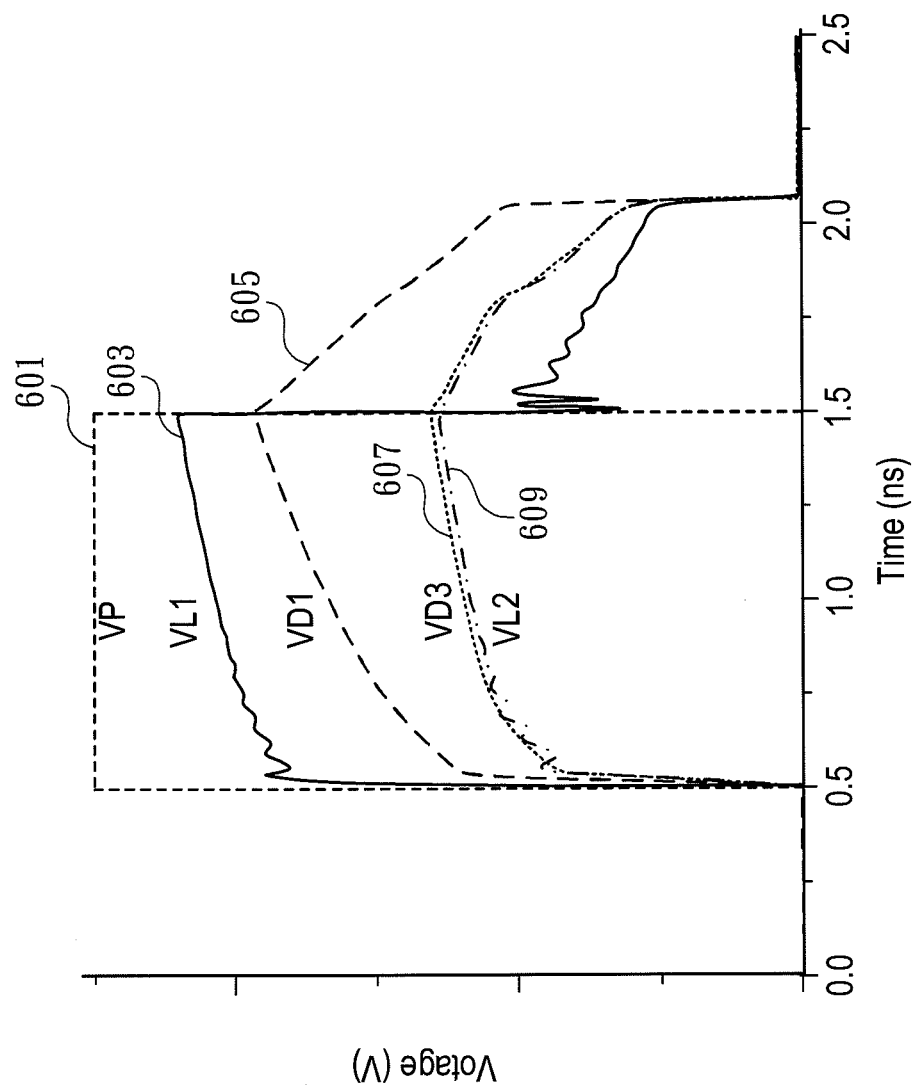
FIG. 6 is a voltage timing diagram of the ESD protection circuit in accordance with the embodiment shown in FIG. 4 during a positive ESD process.

Referring to FIG. 6, there is shown a voltage timing diagram of the ESD protection circuit in accordance with the embodiment shown in FIG. 4 during a positive ESD process.

In this case, a high voltage pulse 601 with 1-ns duration is applied to the band-pass structure ESD protection circuit 40. An induced voltage 603 occurs in the first inductor L1. The voltage 605 on the first diode D1 rises following the ESD pulse, and falls to 0 about 0.7 ns after the end of the ESD pulse.

The voltage 607 on the third diode D3 also rises following the ESD pulse, but is much lower than the voltage 603 and 605 on the first inductor L1 and the first diode D1. The voltage 607 on the third diode D3 also falls to 0 about 0.7 ns after the end of the ESD pulse. The voltage 609 on the second inductor L2 is almost the same as the voltage 607 on the third diode D3.

Figure 7:
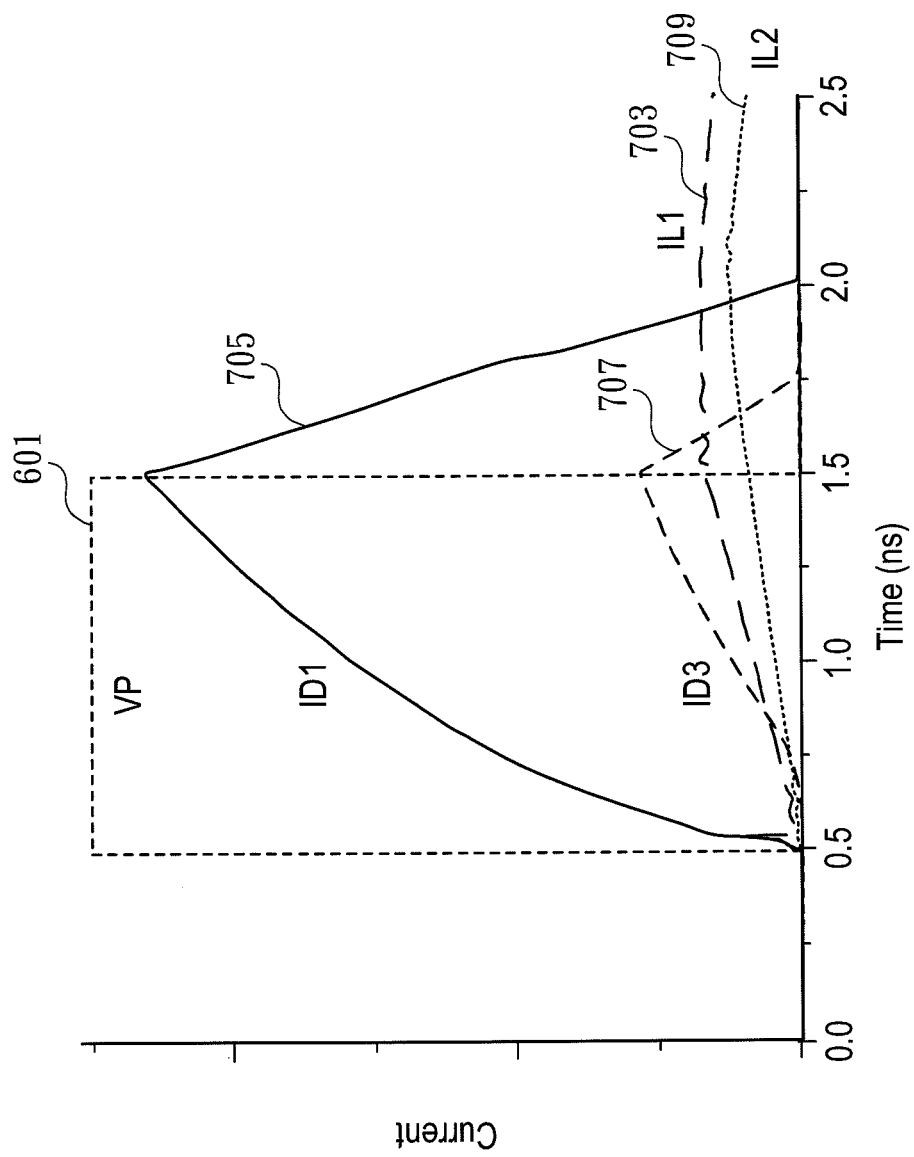
FIG. 7 is a current timing diagram of the ESD protection circuit in accordance with the embodiment shown in FIG. 4 during a positive ESD process.

Referring to FIG. 7, there is shown a current timing diagram of the ESD protection circuit in accordance with the embodiment shown in FIG. 4 during the positive ESD process in FIG. 6. During the ESD process, most of the current is conducted to the power source by the first diode D1, as shown by curve 705. The rest of the current is conducted to the power source and the ground by the third diode D3, the first inductor L1, and the second inductor L2 respectively, as shown by curves 707, 703, and 709.

Figure 8:
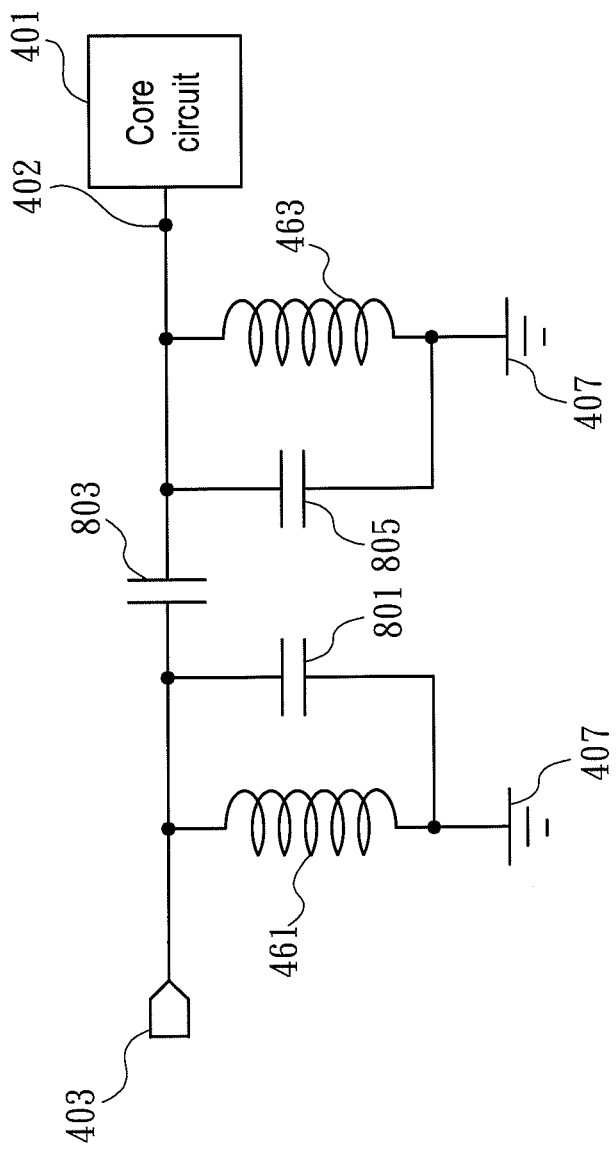
FIG. 8 is a schematic diagram of an equivalent circuit in accordance with the embodiment shown in FIG. 4.

Referring to FIG. 8, there is shown a schematic diagram of an equivalent circuit in accordance with the embodiment shown in FIG. 4. At the operation frequency of the RF core circuit, each diode of the ESD protection circuit acts like a capacitor. Thus, the equivalent circuit of the band-pass structure ESD protection circuit comprises a first equivalent capacitor 801, a second equivalent capacitor 803, a third equivalent capacitor 805, a first inductor 461, and a second inductor 463. The second equivalent capacitor 803 is connected between the external pad 403 and the I/O port 402 of the core circuit 401. The first inductor 461 and the first equivalent capacitor 801 are connected between the external pad 403 and the ground 407 in parallel. The second inductor 463 and the third equivalent capacitor 805 are connected between the I/O port 402 and the ground 407. The equivalent circuit forms a pi-filter.

Assume that the operation frequency of the core circuit 401 is $\omega$, the characteristic impedance under frequency $\omega$ is $Z_o$, and the equivalent capacitance of each diode is $C_{ESD}$. Then, the capacitance of the first equivalent capacitor 801 and the third equivalent capacitor 805 are $C_{ESD}$. The capacitance of the second equivalent capacitor 803 is $2\,C_{ESD}$.

For impedance matching, the inductance of the first inductor 461 and the second inductor 463 are selected to be $1/(C_{ESD}\omega^2)$. And then, the characteristic impedance of the band-pass structure ESD protection circuit will be equal to $Z_o$.

Figure 9:
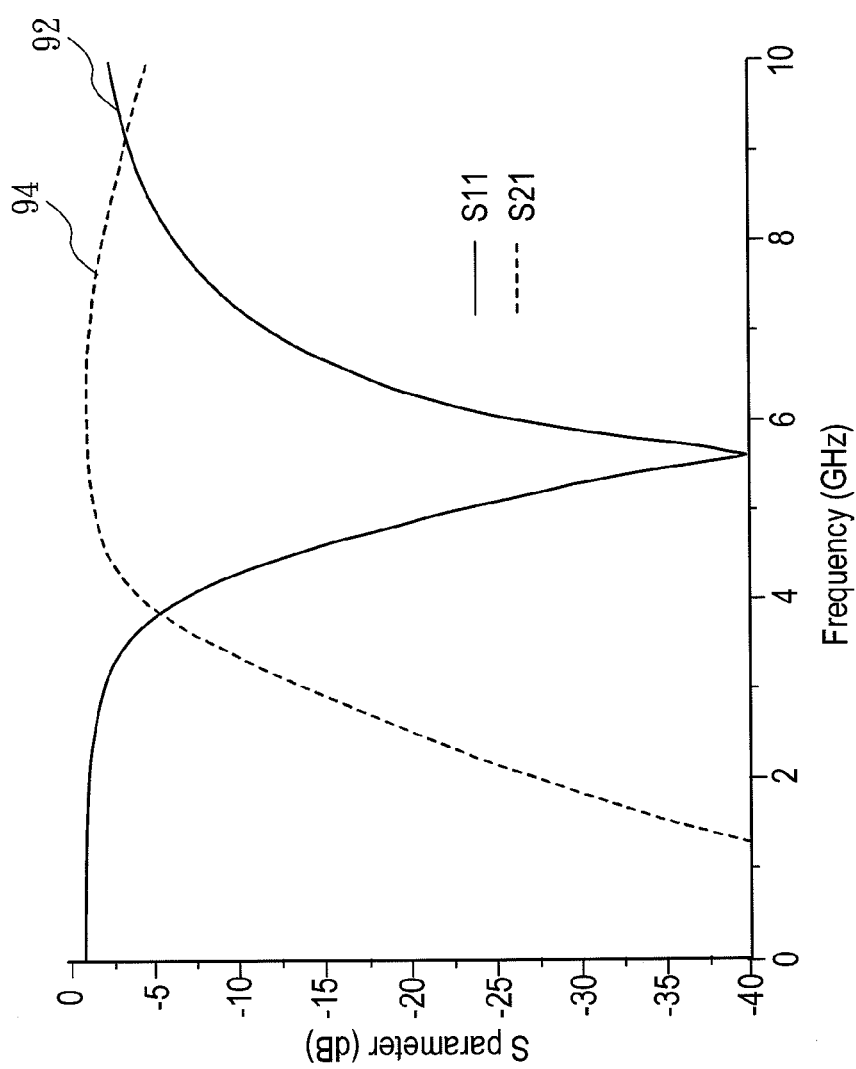
FIG. 9 is an S-parameter diagram of the ESD protection circuit in accordance with the embodiment shown in FIG. 4.

Referring to FIG. 9, there is shown an S-parameter diagram of the ESD protection circuit in accordance with the embodiment shown in FIG. 4.

After the impedance matching, the return loss (S11) 92 of the ESD protection circuit is about −35 dB at 5.8 GHz, and the insertion loss (S21) 94 is about −1 dB. This ensures the RF core circuit high performance with the ESD protection circuit of the present invention.

Figure 11:
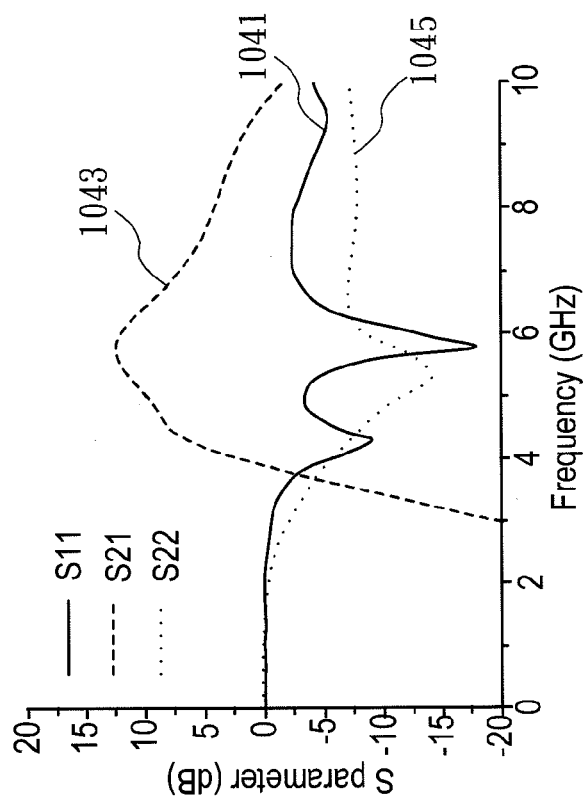
FIG. 11 is an S-parameter diagram of an RF core circuit with the ESD protection circuit in accordance with one embodiment of the present invention.
Figure 10:
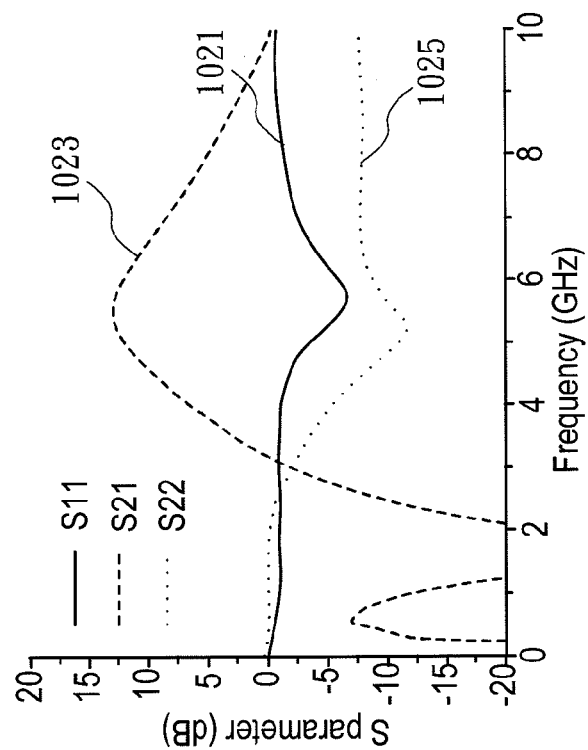
FIG. 10 is an S-parameter diagram of an RF core circuit.

S-parameter diagram of an RF core circuit and an S-parameter diagram of the RF core circuit with the ESD protection circuit in accordance with the embodiment shown in FIG. 4 are respectively shown in FIG. 10 and FIG. 11.

Figure 1:
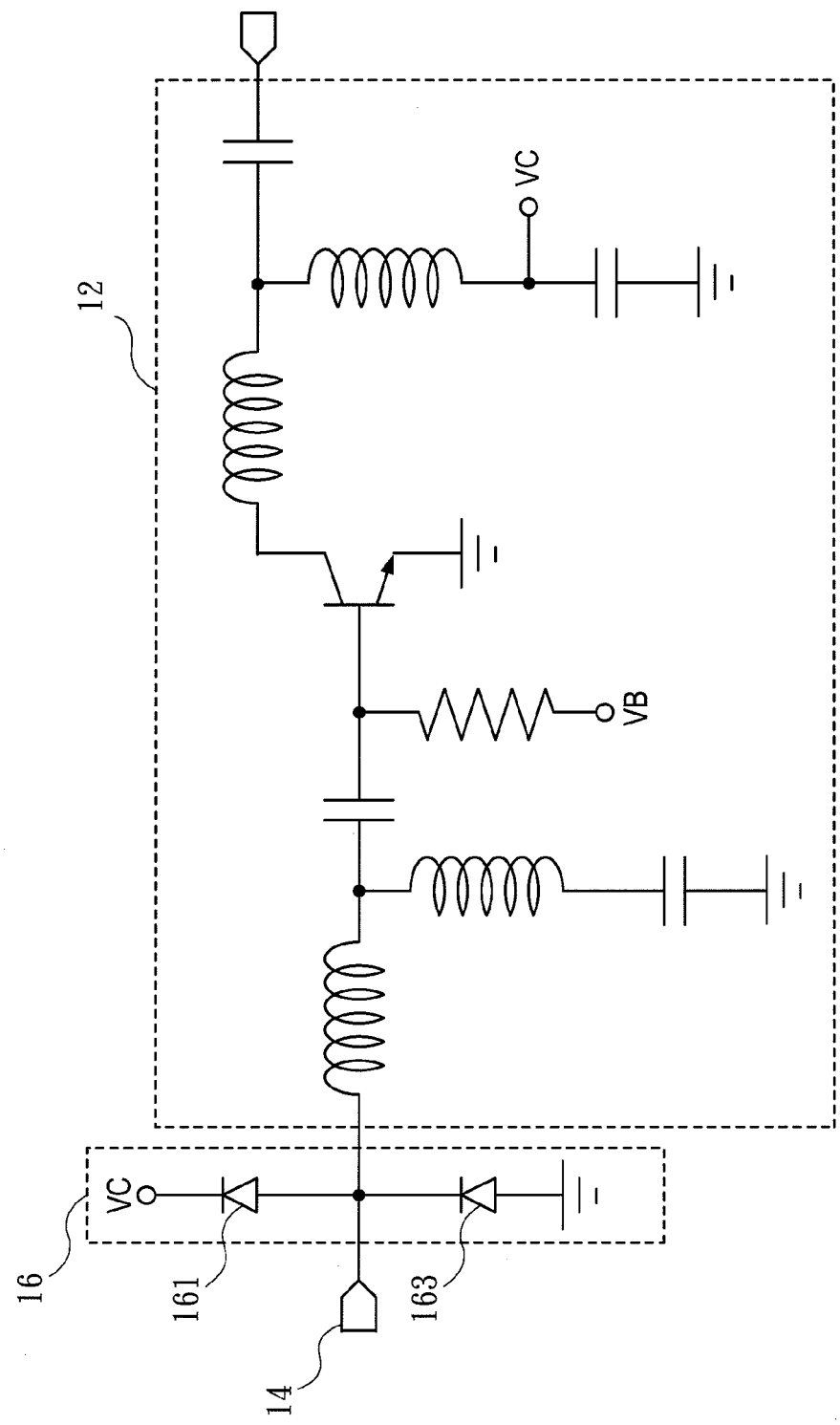
FIG. 1 is a schematic diagram of a traditional ESD protection circuit with an RF circuit.
Figure 2:
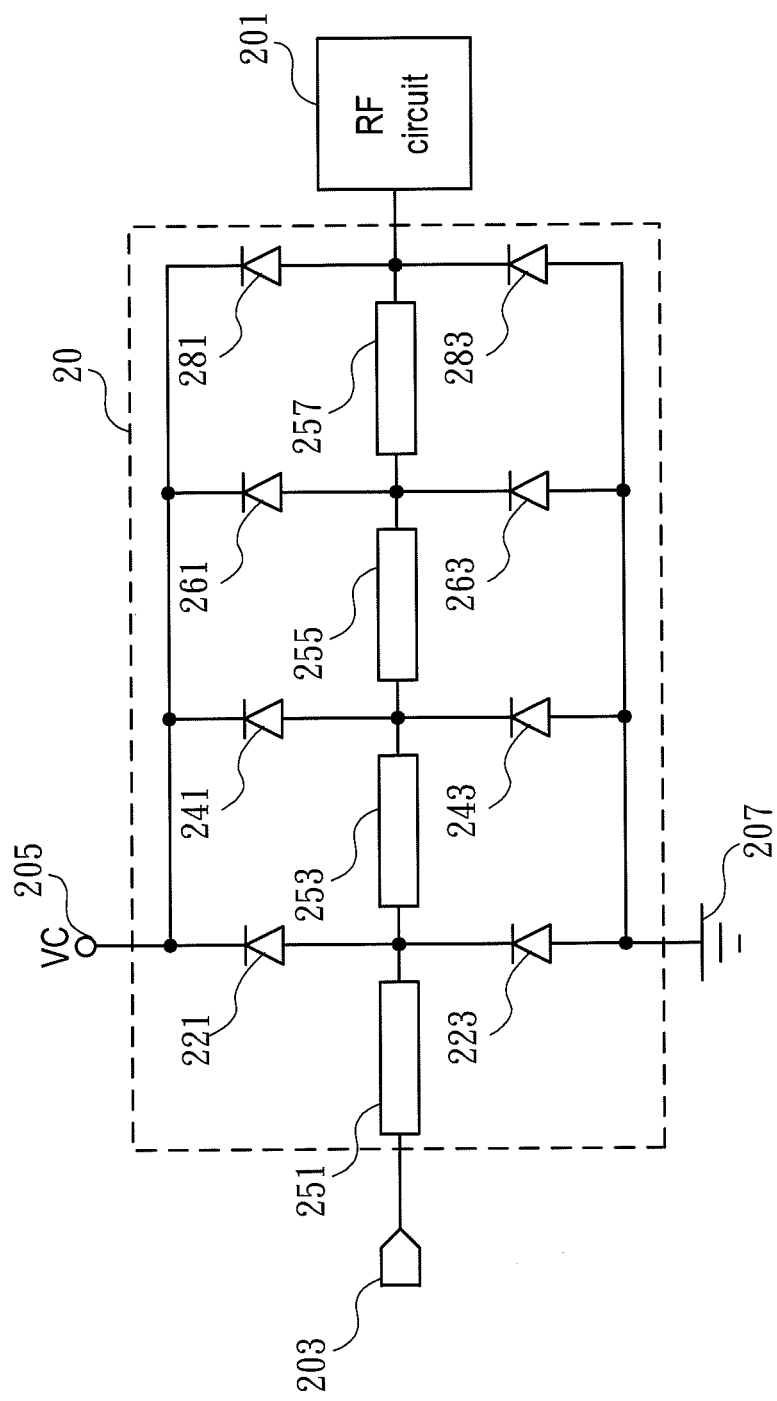
FIG. 2 is a schematic diagram of another conventional ESD protection circuit with an RF circuit.
Figure 3:
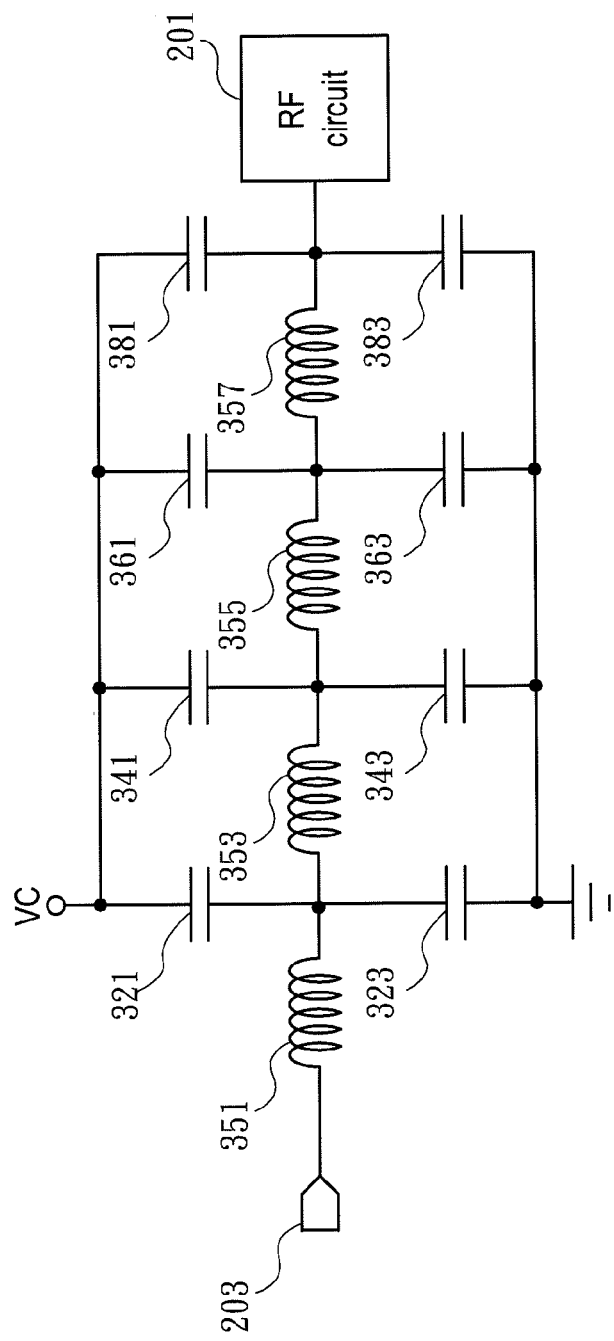
FIG. 3 is a schematic diagram of an equivalent circuit in accordance with the conventional ESD protection circuit shown in FIG. 2.

In this case, the RF core circuit is selected to be the RF circuit 12 in FIG. 1. It is an amplifier, and the operation frequency is 5.8 GHz. The gain (S21) 1023 of the amplifier is about 12.6 dB at 5.8 GHz, the input and output return losses (S11 1021 and S22 1025) are about −7 dB and −9 dB.

The gain 1043 of the amplifier with the band-pass structure ESD protection circuit of the present invention is about 12 dB at 5.8 GHz, the input and output return losses 1041 and 1045 are about −13 dB and −17.5 dB.

From the above observation, the gain of the RF core circuit with the band-pass structure ESD protection circuit of the present invention degrades only 0.6 dB than the unprotected amplifier at 5.8 GHz. The input and output return losses of the protected RF core circuit become lower than the unprotected amplifier.

Furthermore, a lot of experiments prove that the S-parameters of the RF core circuit with the band-pass structure ESD protection circuit of the present invention keep almost the same as FIG. 11 under 19.8 kV ESD stress in HBM or 7 kV ESD stress in MM. The RF core circuit with the band-pass structure ESD protection circuit of the present invention can work well under high voltage ESD stress.

The band-pass structure ESD protection circuit can be fabricated with the RF core circuit by using III/V compound semiconductor process, wherein the GaAs heterojunction bipolar transistor (HBT) process is preferable. Of course, the present invention can also be applied in another processes. In the present invention, the inductor is selected to be a spiral inductor, which can reduce the circuit area for impedance matching. For the amplifier shown in FIG. 1, the band-pass structure ESD protection circuit of the present invention can be merged into the chip with 1.5 mm×1 mm chip size, no extra chip area is needed. In addition, the inductance effect of the transmission line in the ESD protection circuit should be taken into consideration when calculates the inductance of the inductor for impedance matching.

The band-pass structure ESD protection circuit of the present invention can be used for protecting an RF core circuit, such as an RF transceiver, a low noise amplifier, a power amplifier, or a mixer. The external pad 403 of the band-pass structure ESD protection circuit can be connected to an antenna or another I/O element.

The present invention is not limited to the above-described embodiments. Various alternatives, modifications and equivalents may be used. Therefore, the above embodiments should not be taken as limiting the scope of the invention, which is defined by the appending claims.

What is claimed is:

1. A band-pass structure electrostatic discharge (ESD) protection circuit which is connected between an external pad and an input/output (I/O) port of a radio frequency (RF) core circuit, comprising:
a first diode and a second diode, wherein the first diode is connected between a power source and the external pad, the second diode is connected between the external pad and the ground, and the first diode and the second diode are connected in series;
a third diode and a fourth diode, wherein the third diode is connected between the power source and the I/O port, the fourth diode is connected between the I/O port and the ground, and the third diode and the fourth diode are connected in series;
a fifth diode and a sixth diode connected between the external pad and the I/O port reversely in parallel;
a first inductor connected between the external pad and the ground; and
a second inductor connected between the I/O port and the ground,
wherein the operation frequency of the RF core circuit is $\omega$,
wherein the equivalent capacitance of each diode is $C_{ESD}$ and
wherein the inductance of each inductor is $1/(C_{ESD}\omega^2)$.

2. The band-pass structure ESD protection circuit of claim 1, wherein the first inductor and the second inductor are spiral inductors.

3. The band-pass structure ESD protection circuit of claim 1, wherein the RF core circuit and the band-pass structure ESD protection circuit are fabricated by gallium arsenic (GaAs) heterojunction bipolar transistor process.

4. The band-pass structure ESD protection circuit of claim 1, wherein the RF core circuit and the band-pass structure ESD protection circuit are integrated in a chip.

5. The band-pass structure ESD protection circuit of claim 1, wherein the band-pass structure ESD protection circuit provides protection of ESD stress in human body model.

6. The band-pass structure ESD protection circuit of claim 1, wherein band-pass structure ESD protection circuit provides protection of ESD stress in machine model.

7. The band-pass structure ESD protection circuit of claim 1, wherein the RF core circuit is selected from one of a RF transceiver, a low noise amplifier, a power amplifier, or a mixer.

8. The band-pass structure ESD protection circuit of claim 1, wherein the external pad is connected to an antenna or another I/O element.

9. A band-pass structure ESD protection circuit which is connected between an external pad and an I/O port of an RF core circuit, comprising:
a plurality of first diodes and second diodes, wherein each pair of first diode and second diode is connected between a power source and the ground in series;
at least one pair of third diode and fourth diode, wherein each pair of third diode and fourth diode is connected between adjacent pairs of first diodes and second diodes reversely in parallel;
a first inductor connected between the external pad and the ground; and
a second inductor connected between the I/O port and the ground,
wherein the operation frequency of the RF core circuit is $\omega$,
wherein the equivalent capacitance of each diode is $C_{ESD}$ and
wherein the inductance of each inductor is $1/(C_{ESD}\omega^2)$.

10. The band-pass structure ESD protection circuit of claim 9, wherein the first inductor and the second inductor are spiral inductors.

11. The band-pass structure ESD protection circuit of claim 9, wherein the RF core circuit and the band-pass structure ESD protection circuit are fabricated by GaAs heterojunction bipolar transistor process.

* * * * *